(12) United States Patent
Schneider

(10) Patent No.: US 6,594,675 B1
(45) Date of Patent: Jul. 15, 2003

(54) METHOD, SYSTEM FOR USING FILE NAME TO ACCESS APPLICATION PROGRAM WHERE A LOGICAL FILE SYSTEM PROCESSES PATHNAME TO DETERMINE WHETHER THE REQUEST IS A FILE ON STORAGE DEVICE OR OPERATION FOR APPLICATION PROGRAM

(75) Inventor: Richard Schneider, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/383,704

(22) Filed: Aug. 26, 1999

(51) Int. Cl.[7] .............................................. G06F 17/30
(52) U.S. Cl. ........................ 707/200; 707/1; 707/100; 707/102; 707/205
(58) Field of Search ..................... 707/1–7, 200–206, 707/100–104.1; 709/200–209

(56) References Cited

U.S. PATENT DOCUMENTS

| | | | | |
|---|---|---|---|---|
| 5,371,885 A | * | 12/1994 | Letwin | 707/205 |
| 5,537,585 A | * | 7/1996 | Blickenstaff et al. | 707/205 |
| 5,603,019 A | * | 2/1997 | Kish | 707/205 |
| 5,627,996 A | * | 5/1997 | Bauer | 703/20 |
| 5,680,303 A | | 10/1997 | Libucha et al. | 180/167 |
| 5,778,384 A | * | 7/1998 | Provino et al. | 707/200 |
| 5,905,990 A | * | 5/1999 | Inglett | 707/200 |
| 5,991,763 A | * | 11/1999 | Long et al. | 707/101 |
| 6,078,929 A | * | 6/2000 | Rao | 707/200 |
| 6,081,807 A | * | 6/2000 | Story et al. | 707/101 |
| 6,148,311 A | * | 11/2000 | Wishnie et al. | 707/513 |

OTHER PUBLICATIONS

"Mapping a Relational Database to a Hierarchical File System", IBM Technical Disclosure Bulletin, vol. 38, No. 10, Oct. 1995, pp. 309–311.

K.R. Blackman, "Technical Note—IMS Celebrates Thirty Years as an IBM Product", May 25, 1998, IBM Systems Journal, vol. 37, No. 4, pp. 1–13 Nontopical Issue.

* cited by examiner

*Primary Examiner*—Srirama Channavajjala
(74) *Attorney, Agent, or Firm*—David W. Victor; Konrad, Raynes, Victor & Mann

(57) ABSTRACT

Disclosed is a system, method, and program for accessing an application program, such as a transaction manager. A request for a file is received. The request includes a pathname and the pathname includes at least one directory name and the file name. The pathname is processed by a file system to determine whether the request is for a file on a storage device or an operation for the application program to perform. The file request is processed to generate a control message for the application program after determining that the request is not for a file on the storage device. The control message is then passed to the application program to cause the application program to perform an operation.

21 Claims, 2 Drawing Sheets

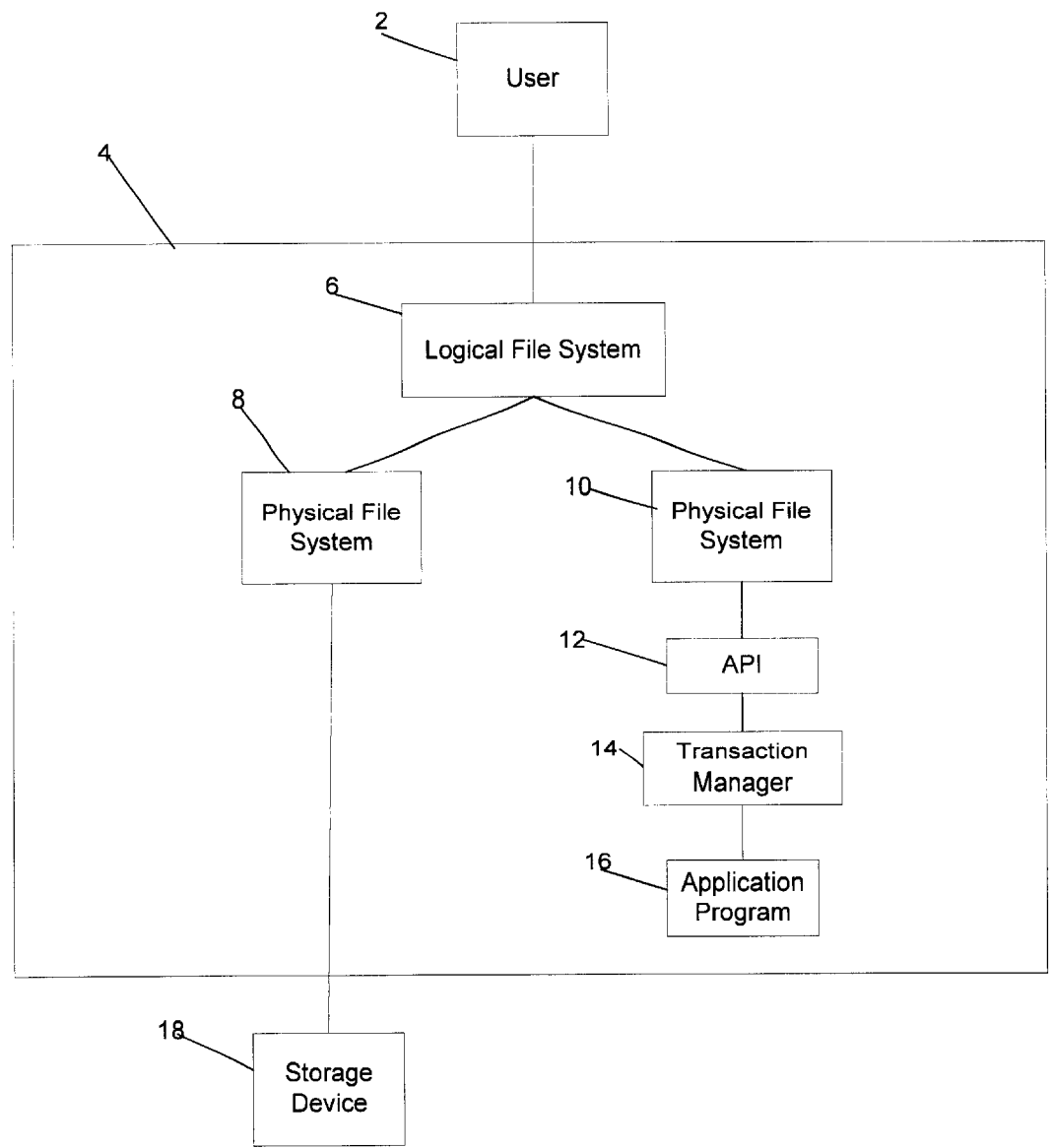

METHOD, SYSTEM FOR USING FILE NAME TO ACCESS APPLICATION PROGRAM WHERE A LOGICAL FILE SYSTEM PROCESSES PATHNAME TO DETERMINE WHETHER THE REQUEST IS A FILE ON STORAGE DEVICE OR OPERATION FOR APPLICATION PROGRAM

BACKGROUND OF THE INVENTION

1. Field of the Invention

The present invention relates to a method, system, and program for accessing an application program and, in particular, using a file name to control the operation of the application program.

2. Description of the Related Art

Database management systems for large scale databases maintaining mission critical data must provide continuous online access to the data, maintain data integrity, provide a timely response to data requests, and provide for the recovery of data in the event of a system failure. One commonly used database management program for managing access to large scale, highly available databases is the International Business Machines Corporation's (IBM) Information Management System (IMS) family of products. IMS includes two main components, an IMS database manager and a data communications manager, otherwise referred to as a transaction manager. The transaction manager processes transactions. A transaction is a set of input data that triggers the execution of a specific job or process. A message destined for an application program and the return of results is considered to be one transaction. The IMS TM can handle thousands of transactions per second.

The IMS transaction manager can parallel process concurrently executing application programs. The transaction manager receives messages from certain sources, schedules the application program, and then executes the application program in a manner to allow parallel processing and separation of application program processing. The IMS transaction manager can execute IMS database programs, non-IMS database programs, and other application programs. The transaction manager allows for cooperative processing, distributed database processing, and continuous operation. The transaction manager further routes messages from terminal to terminal, from application to application, and between application programs and terminals. The transaction manager also schedules messages by associating programs with the transactions they are to process. Still further, applications requesting data from the transaction manager receive the most recent version of the data, including any updates that may not have yet been applied to the database. Details of the IMS transaction manager are described in IBM publications: "IMS/ESA V5 General Information," document no. GC26-3467-00 (Copyright IBM Corp. 1974, 1995) and "Technical Note—IMS Celebrates Thirty Years as an IBM Product," by K. R. Blackman, Systems Journal, Vol. 37, No. 4, Reprint order no. G321-5693 (Copyright IBM 1998), which publications are incorporated herein by reference in their entirety.

For an application program or computer terminal to communicate with the IMS transaction manager and database manager, an application program interface (API) must be developed to interface between the application and IMS. The interface may be written with protocols specific to the transaction manager, such as Advanced Program-to-Program Communications (APPC), TCP/IP, and Open Transaction Manager Access (OTMA). For a computer or terminal to interact with the IMS transaction manager, the workstation must include a programming interface, such as the MS Client Server for Windows (IMS CS for Windows), that allows the workstation to call and execute IMS transactions. Therefore, for each workstation or application that wants to communicate with the transaction manager, there must be a separate application interface to allow communication with the IMS transaction manager.

Thus, there is a need in the art for an improved architecture for allowing application programs to communicate with other programs, such as the IMS transaction manager.

SUMMARY OF THE PREFERRED EMBODIMENTS

To overcome the limitations in the prior art described above, preferred embodiments disclose a system, method, and program for accessing an application program. A request for a file is received. The request includes a pathname and the pathname includes at least one directory name and the file name. The pathname is processed to determine whether the request is for a file on a storage device or an operation for the application program to perform. The file request is processed to generate a control message for the application program after determining that the request is not for a file on the storage device. The control message is then passed to the application program to cause the application program to perform an operation.

In further embodiments, the file name includes input data to the application program and one directory name indicates a command to control the application program. In such case, the control message includes the command indicated in the directory name and the input data indicated in the file name to control the operation of the application program.

In yet further embodiments, the application program is a transaction manager. In such case, the control message causes the transaction manager to schedule the execution of one application program pursuant to information included in the pathname.

Preferred embodiments provide a mechanism for accessing an application program, such as a transaction manager, by using a virtual file name to access the application program through the file system. A user using a viewer program, such as a Web or file browser, may access application programs to perform an operation by specifying the commands and/or parameters of the operation in the pathname of a virtual file name, for which there is no actual file on a storage device. The file system includes the API interface to the application program. The file system processes the file name to determine whether the file name is a file for which there is data on a storage device or a virtual file name intended to access an application program.

In this way, any application program or device can access the application program through the file system without having to develop a separate API to the application program as the file system maintains the interface software. This makes available the functionality of any system application program, such as a transaction manager, to any user or other application program without the need of developing interface software every time a device or program wants to interact with the application program. All that is needed to communicate with the application program is an understanding of the codes to construct the virtual file name that can control the operation of the program.

BRIEF DESCRIPTION OF THE DRAWINGS

Referring now to the drawings in which like reference numbers represent corresponding parts throughout:

FIG. 1 is a block diagram illustrating a computing environment in which preferred embodiments of the present invention are implemented.

DETAILED DESCRIPTION OF THE PREFERRED EMBODIMENTS

Figure 2A:
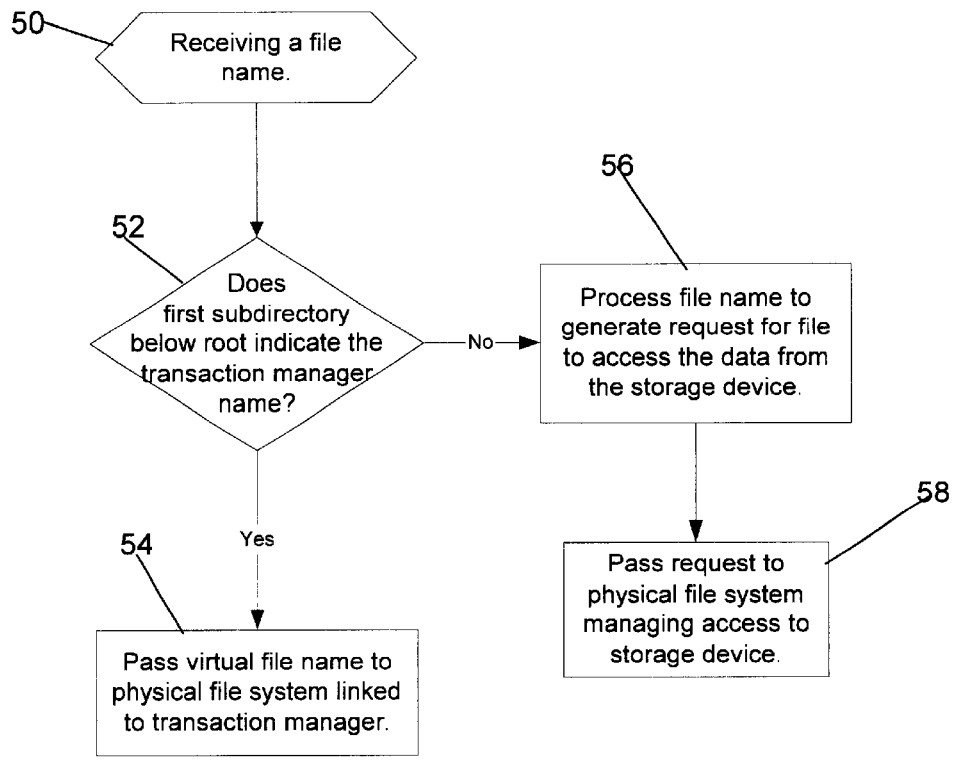
FIG. 2 illustrates logic to process a virtual file name in accordance with preferred embodiments of the present invention.

In the following description, reference is made to the accompanying drawings which form a part hereof and which illustrate several embodiments of the present invention. It is understood that other embodiments may be utilized and structural and operational changes may be made without departing from the scope of the present invention.

Computing Environment

FIG. 1 illustrates a computing environment in which preferred embodiments are implemented. A user 2, which may comprise an individual at a computer terminal or an application program in communication with a computer system 4. The user 2 may be an application program on the system 4 or at a remote computer that communicates with computer 4 over a network. The computer system 4 would operate under control of an operating system, such as MICROSOFT WINDOWS, AIX, OS/390, OS/2, MVS™, UNIX, LINUX** etc. The computer system further includes a logical file system 6, physical file systems 8 and 10, an application program interface (API) 12, transaction manager 14, and an application program 16.

A file system is a logical method for organizing and storing information. The file is the smallest unit in which information is stored. A hierarchical arrangement of directories with respect to a root directory, which is the root node of the hierarchical file structure, defines the logical address of files in the system. For instance, in UNIX file systems, the root directory is represented by the forward slash character "/". Every file and directory in the file system may be identified by a complete list of the names of the directories to that file or directory, which is referred to as the pathname of the file. The pathname includes all directories under which the file is located followed by the file name.

In the AIX operating environment, the logical file system 6 is the level of the file system at which users can request file operations by system calls that carry out file system requests. The logical file system 6 provides the operating system a consistent view of multiple physical file systems 8 and 10. The logical file system provides local name resolution for system calls. Local name resolution allows the logical file system 6 to access multiple file system implementations, such as multiple physical file systems 8 and 10, through a uniform name space. In the AIX system, a virtual file system provides the bridge and interface between the logical file system 6 and physical file systems 8 and 10. In the preferred embodiments, the logical file system 6 would also include the functionality of the virtual file system. Further details of the physical and logical file system operations and architecture are described in IBM publication "AIX Version 4.3 Kernel Extensions and Device Support Programming Concepts," IBM document no. SC23-4125 (Copyright IBM 1997), which publication is incorporated herein by reference in its entirety.

A physical file system typically manages permanent storage of data on a storage device 18. The storage device 18 may be any device known in the art capable of providing non-volatile data storage. A file request would first be handled by the logical file system 6, which would then build a request to access the data to pass to the physical file system 8. The physical file system 8 then proceeds to access the requested data directly from the storage device 16 using the address information of physical data on the storage device 16 to directly address the data on the storage device 16.

The transaction manager 14 may be any program known in the art, such as the IBM IMS transaction manager, which manages messages and requests for data from applications and users in the system, and schedules and manages those requests. The API 12 provides an interface between the transaction manager 14 and the physical file system 10 to allow the physical file system 10 to transmit messages to the transaction manager 14 to cause the transaction manager 14 to perform some action, such as scheduling the execution of the application program 16. The API 12 may comprise a program of protocols, such as the APPC interface that allows applications to communicate with the transaction manager 14. The APPC protocol allows applications distributed throughout a network to communicate regardless of hardware architecture and software environment. The API 12 may be implemented with other interface protocols such as OTMA, TCP/IP, etc. With the API 12 interface, the physical file system 10 can make calls and execute transactions on the transaction manager 14. Further details of developing application interfaces to allow an application to communicate with the transaction manager 14 are described in the IBM publication "IMS/ESA V5 General Information," which was incorporated by reference above.

The application program 16 may be any application program known in the art, such as a database program or any other executable program for performing some action in response to input. The transaction manager 14 schedules and controls execution of one or more application programs 16. Further if the application program is a database program, then the transaction manager 14 is capable of executing a query against the database. The transaction manager 14 may also perform other operations such as transmitting messages to other devices or terminal devices, or transmitting data to application programs.

In preferred embodiments, certain file names are for files maintained in the storage device 18 and other file names are virtual file names intended to cause the transaction manager 14 to perform an action, such as control execution of the application program 16 in response to parameters and information included in the pathname of the virtual file name, The logical file system 6 would maintain the information to map file names representing files maintained in the storage device 18 to the physical file system 8 controlling access to the storage device 18 and map file names representing transaction manager 14 operations to the physical file system 10 that is capable of interfacing and making calls to the transaction manager 14.

Calling An Application Program Using Virtual File Names

In preferred embodiments, the user 2 may initiate a message to affect the transaction manager 14 by building a virtual file name. As used, herein, the term virtual file name includes the pathname components, such as the hierarchical directories followed by the file name. For instance, the virtual file name may have the format of the file name (1) below:

/TM NAME/TRANSACTION NAME/DATA (1)

The directory TM NAME following the root directory, indicated by the first forward slash "/," specifies that the virtual file name (1) is a message for the transaction manager 14 having the name TM NAME. The second level subdirectory TRANSACTION is the name of the transaction the transaction manager 14 is to execute. The file DATA is a message, command, query or any other information being passed to the transaction manager 14 to affect the operation of the transaction manager 14, or affect the application program 16 the transaction manager 14 is controlling. For instance, the DATA may consist of a query that the transaction manager 14 will execute against a database application to return data to the user 2.

Alternatively, the virtual file name may have the format of file name (2) below:

/TM NAME/COMMAND INDICATOR/COMMAND/DATA  (2)

The second level directory COMMAND INDICATOR indicates that the following lower level directory is a command to the transaction manager 14. The next directory COMMAND is the actual transaction manager 14 command and directory DATA is any input data or command parameters passed to the transaction manager 14 to control execution of the command.

FIG. 2 illustrates logic to process the virtual file names to control execution of the transaction manager. The virtual file name would be created by the user 2 to access data or provide data updates for a database. The user 2 may be an application program running on the same or different complex than computer system 4. Alternatively, the user 2 may comprise a file browsing program, such as a Hypertext Mark-Up Language (HTML) browser, e.g., NETSCAPE COMMUNICATOR, MICROSOFT INTERNET EXPLORER,** etc., or a file management program, such as Windows Explorer, that is capable of generating a system call to open or read a file having the user entered virtual file name. In this way, a person using a standard file browser for viewing files could use the file browser to submit a request for a virtual file which would then access the transaction manager 14 to cause the transaction manager 14 to perform the transaction specified by the information in the virtual file name.

**Microsoft, Windows, and Windows NT are registered trademarks of Microsoft Corporation; DB2, AIX, OS/390, and OS/2 are registered trademarks of IBM, MVS is a trademark of IBM; NETSCAPE is a registered trademark of the Netscape Communications Corporation;

After the virtual file name is created by the user 2, the user 2 transmits the virtual file name to the logical file system 6 just as if the user 2 was requesting a file for which there is data stored in the storage device 18. FIG. 2a illustrates logic implemented in the logical file system 6 to process a file name received from the user 2. Control begins at block 50 with the logical file system 6 receiving a file name. The logical file system 6 then processes (at block 52) the first subdirectory from the root directory to determine whether a transaction manager 14 name is provided. If so, the logical file system 6 passes (at block 54) the virtual file name to the physical file system 10 linked with the transaction manage 14 via the API 12. Otherwise, the logical file system 6 processes (at block 56) the file name to generate a request for the file to pass (at block 58) to the physical file system 8 to access the file from the storage device 18 in a manner known in the art.

Figure 2B:
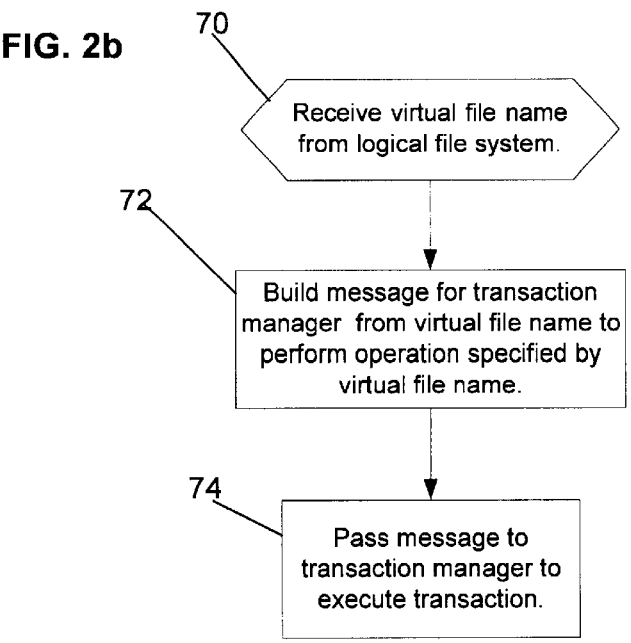

FIG. 2b illustrates logic implemented in the physical file system 10 to use the virtual file name to create a transaction for the transaction manger. The physical file system 10 receives (at block 70) the virtual file name from the logical file system 6. The physical file system 10 then processes the virtual file name to build a message to initiate a transaction with the transaction manager 14. The physical file system 10 would process specific directories in the pathname of the virtual file name to determine the type of message specified in the virtual file name, including any commands and/or input data. For instance, with the virtual file name format (1), the physical file system 10 would determine from the second level TRANSACTION directory the type of transaction to build and from the file name information data to include in the transaction to pass to the transaction manager 14. Further, if the second level directory included the COMMAND INDICATOR, then the physical file system 10 would process the next third level directory to determine the command to create and the DATA to determine parameters of the command indicated in the COMMAND directory. Thus, the physical file system 10 generates a control message based on the information included in the directory paths of the virtual file name. The physical file system 10 would then pass (at block 74), through the API 12, the transaction built from the virtual file name to the transaction manager 14. In response, the transaction manager 14 would schedule the specified transaction built by the physical file system 10. If any data was returned as a result of the scheduled transaction, such as a retrieval of data from a database and any updates thereto, then the transaction manager 14 would return the data to the physical file system 10, which would then return the data to the requesting user 2 via the logical file system 2.

The virtual file name can generate at least three types of input messages for the transaction manager 14. One is a message to execute the application program 16, which is also refereed to as a transaction which includes information on the application program that is the destination of the message. Second is a message switch that includes information to send to a logical terminal, which may comprise any type of terminal device, such as display devices, high-speed printers, and remote subsystems. If the message has the name of the logical terminal, then the message is sent directly to the logical terminal without the intervention of an application program 16. In this way, the virtual file name can cause the creation of a message or data to transfer to a logical device, which the transaction manager will schedule and manage. Another message type is a command that directs the transaction manager 14 to perform a function such as displaying or altering the status of one or more IMS system resources. The transaction manager 14 queues the messages to process as scheduled.

With preferred embodiments, if the user 2 is a viewer program, such as a Web browser or file system browser, then a person may enter a virtual file name into the location or address field in the viewer program. When the viewing program generates a system call to open or read the virtual file name, the information in the virtual file name will then be transferred to the transaction manager 14 via the logical 6 and physical 10 file systems to cause the transaction manger 14 to perform a specific action. In this way, the user program 2 issues a command to read or open a virtual file name to access the transaction manager 14 without having to use a transaction manager interface specifically developed for the user 2 application. This is because all the interfacing is handled by the API 12 associated with the physical file system 10. Further, the user 2 may be any type of application program that wants to access the transaction manager 14 to perform a specific operation, e.g., control a terminal, access a database, execute an application program, etc. This allows any application program, terminal, etc., to access the transaction manager 14. For instance, a user at a web browser can create a virtual file name to query and access specific information from a database managed by the transaction manager 14. Upon processing the virtual file name, the transaction manager 14 would return the requested data from the database to the web browser to display.

Conclusions And Alternative Embodiments

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications that may be made to this configuration without departing from the scope of the present invention.

Preferred embodiments were described with respect to a logical file system and physical file system for processing the virtual file system. However, in alternative embodiments, the operating system may only maintain a logical file system, such as FAT, FAT32, etc. In such case, the logical file system would process the virtual file system and send through an API linked to the logical file system the command indicated by the virtual file name to the transaction manager. Alternatively, the functions described as being performed by the physical and logical file systems, may be performed by a single file system component or by multiple file system components, such as a virtual file system.

The user 2 may be implemented in a separate computer system from the computer 4. In such case, the user 2 would communicate with the computer system 4 10 via some network communication line. Alternatively, the user 2 may run within the computer 4.

In preferred embodiments, there was one physical file system shown linking with one transaction manager 14. However, in further embodiments, there may be multiple logical and physical file systems. Further, the physical file system 10 may map virtual file names to more than one transaction manager, depending on the transaction manager specified in the virtual file name. In such case the physical file system 10 would include different APIs to communicate with the different transaction managers. Further, there may be more than one physical file system for interfacing with multiple transaction managers, each including an API to interface with a transaction manager.

Preferred embodiments were described with respect to using the file systems to access a transaction manager program, such as the MS transaction manager. However, in further embodiments, the preferred file system and API architecture may be used to access any type of application program, not just a transaction manager program.

In summary, preferred embodiments disclose a system, method, and program for accessing an application program. A request for a file is received. The request includes a pathname and the pathname includes at least one directory name and the file name. The pathname is processed to determine whether the request is for a file on storage device or an operation for the application program to perform. The file request is processed to generate a control message for the application program after determining that the request is not for a file on the storage device. The control message is then passed to the application program to cause the application program to perform an operation.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for accessing an application program, comprising:

receiving a request for a file, wherein the request includes a pathname, wherein the pathname includes at least one directory name and the file name;

processing the pathname to determine whether the request.is for one of: (i) a file on a storage device and (ii) an operation for the application program to perform;

transmitting the request to a first file system if the request is for a file on the storage device;

transmitting the request to a second file system if the request is for the operation for the application program to perform;

processing, with the second file system, the file request to generate a control message for the application program after determining that the request is for the application program; and passing the control message to the application program to cause the application program to perform an operation.

2. The method of claim 1, wherein processing the pathname comprises processing one directory name in the pathname to determine whether the directory name indicates the application program, wherein the request is for the application program after determining that the directory name indicates the application program.

3. The method of claim 1, wherein the file name includes input data to the application program and one directory name indicates a command to control the application program, wherein the control message includes the command indicated in the directory name and the input data indicated in the file name to control the operation of the application program.

4. The method of claim 1, wherein the application program is a transaction manager, wherein the control message causes the transaction manager to schedule the execution of one application program pursuant to information included in the pathname.

5. The method of claim 4, wherein one directory indicates a query for a database and the file name indicates parameters of the query, wherein the control message requests the transaction manager to execute the query indicated in the directory and file name against the database.

6. The method of claim 1, wherein a logical file system processes the pathname to determine whether the request is for a file on the storage device or the operation for the application program, and wherein the first file system comprises a first physical file system and wherein the second file system comprises a second physical file system, wherein the logical file system transmits the request to the first physical file system to access the requested data in the file in the pathname from the storage device after determining that the request is for a file on the storage device, and wherein the logical file system transmits the request to the second physical file system by transmitting information in the pathname to a the second physical file system, wherein the second physical file system generates the control message and sends the control message to the application program.

7. The method of claim 1, wherein the control message causes the application program to perform an action that is a member of the set of actions consisting of transferring a message to a second application program for processing; transferring a message to a terminal device; sending a command to the application program to control the second application program.

8. A system for accessing an application program, comprising:
- a computer system;
- a storage device accessible to the computer system;
- a memory accessible to the computer system including a first and second file systems providing a mapping of file names to one of addressable location in the storage device and the application program;
- program logic, executed by the computer system, comprising:
  - (i) means for receiving a request for a file, wherein the request includes a pathname, wherein the pathname includes at least one directory name and the file name;
  - (ii) means for processing the pathname and the file system to determine whether the request is for one of: (a) a file on a storage device and (b) the application program;
  - (iii) means for transmitting the request to a first file system if the request is for a file on the storage device;
  - (iv) means for transmitting the request to a second file system if the request is for the operation for the application program to perform;
  - (iii) means for processing, with the second file system, the file request to generate a control message for the application program after determining that the request is for the application program; and
  - (iv) means for passing the control message to the application program to cause the application program to perform an operation.

9. The system of claim 8, wherein the program logic for processing the pathname comprises means for processing one directory name in the pathname to determine whether the directory name indicates the application program, wherein the request is for the application program after determining that the directory name indicates the application program.

10. The system of claim 8, wherein the file name includes input data to the application program and one directory name indicates a command to control the application program, wherein the program logic generates the control message to include the command indicated in the directory name and the input data indicated in the file name to control the operation of the application program.

11. The system of claim 8, wherein the application program is a transaction manager, wherein the control message causes the transaction manager to schedule the execution of one application program pursuant to information included in the pathname.

12. The system of claim 11, wherein one directory indicates a query for a database and the file name indicates parameters of the query, wherein the program logic generates the control message to request the transaction manager to execute the query indicated in the directory and file name against the database.

13. The system of claim 8, further comprising:
- a logical file system that processes the pathname to determine whether the request is for a file on the storage device or the operation for the application program, wherein the first file system comprises a first physical file system and wherein the second file system comprises a second physical file system, wherein the means for transmitting the request to the first physical file system is performed by the logical file system that transmits a request to the first physical file system to access the requested data in the file in the pathname from the storage device after determining that the request is for a file on the storage device, and wherein the means for transmitting the request to the second file system is performed by the logical file system that transmits information in the pathname to a second physical file system, wherein the second file system generates the control message and sends the control message to the application program.

14. The system of claim 8, wherein the control message causes the application program to perform an action that is a member of the set of actions consisting of: transferring a message to a second application program for processing; transferring a message to a terminal device; sending a command to the application program to control the second application program.

15. An article of manufacture for accessing an application program, the article of manufacture comprising computer usable storage media including at least one computer program embedded therein that is capable of causing a computer system to perform:
- receiving a request for a file, wherein the request includes a pathname, wherein the pathname includes at least one directory name and the file name;
- processing the pathname to determine whether the request is for one of: (i) a file on a storage device and (ii) an operation for the application program to perform;
- transmitting the request to a first file system if the request is for a file on the storage device;
- transmitting the request to a second file system if the request is for the operation for the application program to perform;
- processing, with the second file system, the file request to generate a control message for the application program after determining that the request is for the application program; and
- passing the control message to the application program to cause the application program to perform an operation.

16. The article of manufacture of claim 15, wherein processing the pathname comprises processing one directory name in the pathname to determine whether the directory name indicates the application program, wherein the request is for the application program after determining that the directory name indicates the application program.

17. The article of manufacture of claim 15, wherein the file name includes input data to the application program and one directory name indicates a command to control the application program, wherein the control message includes the command indicated in the directory name and the input data indicated in the file name to control the operation of the application program.

18. The article of manufacture of claim 15, wherein the application program is a transaction manager, wherein the control message causes the transaction manager to schedule the execution of one application program pursuant to information included in the pathname.

19. The article of manufacture of claim 18, wherein one directory indicates a query for a database and the file name indicates parameters of the query, wherein the control message requests the transaction manager to execute the query indicated in the directory and file name against the database.

20. The article of manufacture of claim 15, wherein a logical file system processes the pathname to determine whether the request is for a file on the storage device or the operation for the application program, wherein the first file system comprises a first physical file system and wherein the second file system comprises a second physical file system, wherein the logical file system transmits the request to the first physical file system to access the requested data in the file in the pathname from the storage device after determining that the request is for a file on the storage device, and wherein the logical file system transmits the request to the second physical file system by transmitting information in the pathname to the second physical file system, wherein the second physical file system generates the control message and sends the control message to the application program.

21. The article of manufacture of claim 15, wherein the control message causes the application program to perform an action that is a member of the set of actions consisting of: transferring a message to a second application program for processing; transferring a message to a terminal device; sending a command to the application program to control the second application program.

* * * * *

UNITED STATES PATENT AND TRADEMARK OFFICE
CERTIFICATE OF CORRECTION

PATENT NO. : 6,594,675 B1
DATED : July 15, 2003
INVENTOR(S) : Schneider

It is certified that error appears in the above-identified patent and that said Letters Patent is hereby corrected as shown below:

Column 4,
Line 4, delete "16" and insert -- 18 --.
Line 6, (each instance), delete "16" and insert -- 18 --.

Column 8,
Line 26, delete "the" and insert -- a --.

Column 9,
Line 14, delete "of" and insert -- of: --.
Line 31, delete "the" and insert -- a --.
Line 34, delete "system" and insert -- name --.
Lines 37 and 40, delete "a" and insert -- the --.

Column 10,
Line 40, delete "the" and insert -- a --.

Signed and Sealed this

Third Day of January, 2006

JON W. DUDAS
*Director of the United States Patent and Trademark Office*